United States Patent [19]

Mosch

[11] Patent Number: 5,057,589
[45] Date of Patent: Oct. 15, 1991

[54] PROCESS FOR THE PREPARATION OF MODIFIED POLYSILOXANES, THE POLYSILOXANES THUS PREPARED, THEIR USE AND THE MATERIALS THUS TREATED

[75] Inventor: Franz Mosch, Diedorf, Fed. Rep. of Germany

[73] Assignee: Ciba-Geigy Corporation, Ardsley, N.Y.

[21] Appl. No.: 472,678

[22] Filed: Jan. 30, 1990

[30] Foreign Application Priority Data

Feb. 2, 1989 [DE] Fed. Rep. of Germany ....... 3903005

[51] Int. Cl.$^5$ .............................................. C08G 77/06
[52] U.S. Cl. ..................................... 528/24; 528/25; 556/427
[58] Field of Search ...................... 528/25, 24; 556/427

[56] References Cited

U.S. PATENT DOCUMENTS

| | | | |
|---|---|---|---|
| 3,794,672 | 2/1974 | Kim | 260/448.2 |
| 3,949,136 | 4/1976 | Deiner | 428/260 |
| 4,171,282 | 10/1979 | Mueller | 252/356 |
| 4,421,783 | 12/1983 | Marwitz | 427/54.1 |
| 4,633,004 | 12/1986 | Boutevin | 556/419 |

FOREIGN PATENT DOCUMENTS 2062816  6/1972  Fed. Rep. of Germany .

Primary Examiner—Melvyn I. Marquis
Attorney, Agent, or Firm—George R. Dohmann; Edward McC. Roberts

[57] ABSTRACT

A process is described for the preparation of modified polysiloxanes by reaction of polyvinylsiloxanes with compounds of the formula

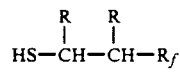

in which R is H, CH$_3$ or C$_2$H$_5$, in which at least one radical R is H, and R$_f$ is a perfluoroalkyl radical having 8 to 16 C atoms, in about equivalent amounts, relative to the vinyl groups, at elevated temperature. In addition, the polysiloxanes prepared in this manner are protected. Equally, the use of these polysiloxanes for the oil- and water-repellent treatment of fiber materials is claimed. This treatment makes it possible to achieve very good wash- and cleaning-resistant oil- and water-repellency, using small amounts of fluorine.

12 Claims, No Drawings

PROCESS FOR THE PREPARATION OF MODIFIED POLYSILOXANES, THE POLYSILOXANES THUS PREPARED, THEIR USE AND THE MATERIALS THUS TREATED

The present invention comprises a process for the preparation of modified polysiloxanes by reaction of polyvinylsiloxanes with selected compounds which contain perfluoroalkyl groups, the polysiloxanes thus prepared, their use and the materials thus treated.

U.S. Pat. No. 4,633,004 has disclosed fluorosilanes which are prepared by the addition reaction of mercaptosilanes with fluorinated olefins. These compounds are suitable for preparing fluorinated elastomeric silicones. The use of these products for textile finishing is not mentioned in this prior art.

In DE-A 2,409,383, siloxanes carrying lower perfluoroalkyl groups (having 1 to 4 C atoms) are disclosed. These siloxanes are recommended, inter alia, for water- and oil-repellent textile finishes. However, tests have shown that the oil- and water-repellent effects no longer meet today's requirements at all.

The object of the present invention was to develop a process for the preparation of modified polysiloxanes which upon application ensure wash- and cleaning-resistant oil- and water-repellent effects on the fiber materials treated with them. Surprisingly, this object was achieved by reacting polyvinylsiloxanes with compounds of the formula (1)

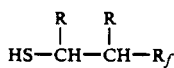  (1)

in which R is H, CH₃ or C₂H₅, in which at least one radical R is H, and R$_f$ is a perfluoroalkyl radical having 8 to 16 C atoms, in about equivalent amounts, relative to the vinyl groups, at elevated temperature.

Also claimed are preferred embodiments of the process according to the invention, the polysiloxanes thus prepared, and the use of the polysiloxanes prepared in this manner for the treatment of fiber materials and protect the fiber materials thus treated.

The starting materials for the process according to the invention are polyvinylsiloxanes and thiols of the formula (1) containing perfluoroalkyl groups.

The polyvinylsiloxanes are known and are prepared in a conventional manner by hydrolysis of alkylvinyldichlorosilanes. Care must be taken that no hydrolysis with other silanes, for example dimethyldichlorosilane, takes place. For economic reasons, methylvinyldichlorosilane is preferably used for the preparation of the polyvinylsiloxanes. Hydrolysis of these silanes gives polyvinylsiloxanes which consist of more than 50%, in particular 70 to 90%, of polyvinylsiloxane chains. Thus, for example in the hydrolysis of vinylmethyldichlorosilane, siloxanes of the formula (2)

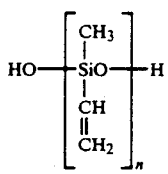  (2)

in which n is an integer from 10 to 100, in particular 30 to 50, are formed.

Apart from these, conventional hydrolysis gives polyvinylsiloxane rings, that is, cyclic polyvinylsiloxanes, for example those of the formula

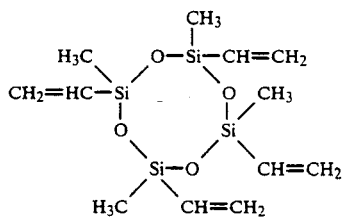

During the hydrolysis, care must be taken that the cyclic polysiloxane content is kept at a minimum, since the modified polysiloxanes prepared with these cyclic polyvinylsiloxanes give less favorable effects in application. It may be appropriate to increase the straight-chain polyvinylsiloxane content by known physical methods to such an extent that it is at least above 70%.

This means that each Si atom in the polyvinylsiloxanes used carries one vinyl group, that is, only if this type of starting compound is used can the required effects be ensured when the modified polyvinylsiloxanes are employed. The other ligands are of minor importance, although—as already discussed above—for economic reasons, the corresponding methyl compounds are preferably used.

Further starting compounds which can be used are those of the formula (1)

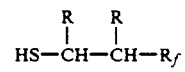  (1)

in which R is H, CH₃ or C₂H₅, in which at least one radical R is H, and R$_f$ is a perfluoroalkyl radical having 8 to 16 C atoms. Compounds of the formula (1) in which both radicals R are H and R$_f$ is a perfluoroalkyl radical having 10 to 12 C atoms are particularly suitable. These compounds as well as the polyvinylsiloxanes described above are sufficiently well known. The polyvinylsiloxanes are modified by reacting them with the compounds of the formula (1) in general in about equivalent amounts, relative to the vinyl groups, small excess amounts of one or the other reactant being possible. In particular, care must be taken that the excess of polyvinylsiloxanes, relative to the vinyl groups,—this is the preferred procedure—does not exceed certain values, since otherwise the effects, when the modified polysiloxanes are employed, again deteriorate considerably. According to the invention, it is particularly preferred to use a 5 to 10% excess. However, it is also quite possible—without significant deterioration of the effect—to carry out the reaction with an excess of up to 30% at the most. Reaction products which are no longer usable, since their effect is already considerably diminished, are obtained if the polyvinylsiloxanes excess, relative to the vinyl groups, increases further. Therefore, excess amounts of more than 30% must be avoided at all costs, since otherwise the water-repellent effect of fiber materials which have been treated with the polysiloxanes prepared according to the invention is unsatisfactory, and the oil-repellent effect in some cases even gets lost entirely. The compounds of the formula (1) are usually not used in excess for ecological and economical reasons, although it can certainly be justified to increase the amounts by up to 10%.

The modified polysiloxanes are prepared from the polyvinylsiloxanes and the compounds of the formula (1) simply by reacting the two compounds undiluted in the amounts mentioned, preferably in the presence of an organic solvent, in particular benzo trifluoride, xylene hexafluoride or mixtures of these solvents with ketones, for example methyl isobutyl ketone or methyl ethyl ketone or with petroleum fractions, for example n-heptane, preferably at temperatures of about 40° to 120° C., particularly preferably 60° to 100° C., in particular under an inert gas atmosphere. The reaction is usually carried out in the presence of catalysts that is, free radical formers, for example azoisobutyrodinitrile and similar compounds. The reaction is completed by an additional reaction with further addition of catalyst. The usual reaction time is about 1½ to 3 hours followed by a further reaction time of about 1 to 4 hours. In the preferred procedure, the reaction is completed as soon as the test for unreacted compound (1) is negative.

The modified polysiloxanes prepared according to the invention can be used directly, that is in the form of solutions, for the treatment of fiber materials. However, it is preferred—in particular for ecological reasons—to convert them into solvent-free aqueous dispersions and use them in this form.

The preparation of aqueous dispersions from the product prepared as described takes place in a known manner, and one skilled in the art will have no difficulties in selecting the proper emulsifiers and the proper procedure. However, for the sake of completeness, a few emulsifiers and also a standard method for preparing the dispersions will be explained in general. Suitable emulsifiers are—depending on the further use of the dispersions—in particular weakly cationic and nonionic emulsifiers, which can be employed in amounts of 3 to 50%, in particular 8 to 40%, relative to the active substance. Examples of emulsifiers are ethylene oxide adducts of fatty alcohols, in particular those of primary and/or secondary, linear or branched alcohols having 8 to 16 C atoms and ethoxylated $C_6$ to $C_{12}$-alkylphenols, the number of ethylene oxide units being between 5 and 30. Apart from them, nitrogen-containing emulsifiers, such as are formed by ethoxylation of fatty amines or fatty amides, are equally suitable, it also being possible for these compounds to be present in salt form after the addition of acids. Examples are 2,6,8-trimethyl-4-nonyloxyhexaethyleneoxyethanol, isotridecyl ethoxylate having on average 8 ethylene oxide units and hexadecylamine ethoxylated with on average 15 mol of ethylene oxide, which can also be present in the form of the acetate.

To prepare the aqueous dispersions, for example, water and emulsifier are mixed, the mixture is heated to an elevated temperature and the polysiloxane prepared according to the invention and also heated to an elevated temperature, is stirred in by means of a turbine, possibly in the form of a solution originating from the preparation. The resulting predispersion is then homogenized in a high-pressure homogenizer at elevated pressure and moderately elevated temperature. Any solvent still present from the preparation is finally evaporated off, if necessary under reduced pressure. The dispersions obtained have about 10 to 40% by weight of active substance.

The aqueous dispersion thus obtained, like the organic solutions of the modified polysiloxanes described are highly suitable, after dilution, for oil- and water-repellent treatment, in particular for fiber material, in particular for textile, finishes (if other treatment methods, for example in combination with a coating process, are desired, one skilled in the art will have no difficulties in following a procedure in analogy with the process according to the invention). The amounts used are selected in such a manner that, while taking into account the conventional amounts of solid applied, the finishing bath contains about 1.5 to 4.5 g/l of flourine, which usually corresponds to an amount employed of 10 to 100 g/l of liquor of the dispersions prepared as described. The finishing itself is carried out in a known manner, predominantly by padding, drying and curing, although spraying is also particularly suitable.

It is of course also possible to add further auxiliaries customary in the textile industry to the finishing bath within the present procedure. In this context, cellulose crosslinking agents should be mentioned in particular, since by means of them not only the desired crease resistance but additionally also a certain stabilization of the effects is achieved. However, apart from them, filler resins, flame retardants, nonslip agents and similar products and catalysts, which may additionally be necessary, all of them in customary amounts, may also be mentioned as additives.

When the polysiloxanes prepared according to the invention are used, like in known finishing processes of this type, fiber materials of any kind can be used. The fiber materials are in particular textiles, examples of suitable fibers being those consisting of cellulose fibers or containing at least in part cellulose fibers. Other suitable fibers apart from cellulose are not only synthetic fibers, such as polyester, polyamide or polyacrylonitrile fibers, but also wool. It is, of course, also possible to use the process according to the invention for the finishing of pure synthetic fiber and wool fiber material. In all cases, the process according to the invention has proven to be highly suitable, despite only small amounts of added fluorine.

The process according to the invention makes it possible to prepare, in a simple manner, modified polysiloxanes which give very good wash- and cleaning-resistant oil- and water-repellent properties upon application to the fiber materials treated therewith, and also result in a quite pleasant handle. Knowing the prior art described, it could not be expected that the compounds of the formula (1) would simply undergo an addition reaction with polyvinylsiloxanes without the vinyl groups, in particular due to the free radical formers preferably being present at the same time, reacting with one another and thus substantially preventing the desired reaction.

In addition, it could not be expected that by using the present reaction products prepared according to the invention it would be possible within the conventional procedure to achieve such excellent overall effects. It is surprising that these overall effects can be achieved, despite the, after all, relatively small amounts of fluorine added on. Thus, it should be noted that the invention provides polysiloxanes modified according to the invention which upon application make it possible to follow a simple reliable procedure for achieving the very good effects mentioned without the necessity of compensating for any disadvantages thereof by combining them with other fluorinated products.

In the examples which follow, the process according to the invention and the application of the modified polysiloxanes prepared therein are described in more detail, in which the percentages are percent by weight.

EXAMPLE 1

Product A1)

In a 2-l four-necked flask equipped with a 2-necked attachment, an efficient reflux condenser, a nitrogen introduction tube, a stirrer with Teflon seal, an inside thermometer and a graduated addition vessel, 610 g of an $R_f$-thiol mixture ($C_nF_{2n+1}CH_2CH_2SH$ containing 7% of $C_8F_{17}$; 64.8% of $C_{10}F_{21}$; 20.5% of $C_{12}F_{25}$; 5.9% of $C_{14}F_{29}$; balance $C_{16}F_{33}$; average molecular weight 610), 1.05 mols (90 g of the hydrolysis product of methylvinyldichlorosilane containing 75% of linear portions having about 40 Si building blocks and 25% cyclic portions) and 250 g of m-xylene hexafluoride are weighed together and heated to 85° C. in an oil bath, while flushing with nitrogen. This gives a slightly cloudy, not entirely homogeneous mixture. 6.1 g of α,α'-azoisobutyronitrile are then dissolved in 60 ml of methyl ethyl ketone, the solution is poured into the burette and 6 ml of the catalyst solution are metered into the reaction mixture every 10 minutes. The first addition causes an exothermic reaction with an increase in temperature to 100° to 105° C. This immediately gives a clear homogeneous solution. After the addition of catalyst is completed, stirring at 83° to 87° C. is continued for another 2 hours to complete the addition reaction. The concentration of the reaction solution is then adjusted to 50% with m-xylene hexafluoride, that is, solvent is added up to a final weight of 1400 g.

Dispersion is carried out by dissolving 10 g of emulsifier (dodecyloxypropylamine ethoxylated with an average of 12 mol of ethylene oxide in the form of the acetate) in 280 g of hot water at 70° C. and adding 200 g of the above reaction mixture heated to 70° C. by means of a high-speed stirrer and stirring for about 1 minute. This preemulsion is homogenized in a high-pressure homogenizer preheated with steam at about 300 bar and 60° C. (4 passages).

To remove the solvent, the dispersion is then transferred to a 1-1 3-necked flask equipped with stirrer and descending condenser, and the solvent (m-xylene hexafluoride and methyl ethyl ketone) is distilled off azeotropically without vacuum by means of a hot oil bath of about 130° C. After the solvent has been distilled off completely, the dispersion is filtered and brought to a fluorine content of 11.3% by addition of water.

Product B1)

As product A1), except that 1 mol of a pure $C_{10}F_{21}CH_2CH_2SH$ is used as compound of the formula (1) instead of the $R_f$-thiol mixture (brought to the same fluorine content).

Product C1)

As product A1), except that the reaction is carried out with 1 mol of an $R_f$-thiol of the formula $C_4H_9CH_2CH_2SH$ for comparison (brought to the same fluorine content).

Product D1)

As product A1), except that the reaction is carried out with a cyclic vinylsiloxane for comparison.

Finishing

For finishing, a dark blue cotton batiste (about 90 g/m$^2$) is padded with a liquor which, in addition to 30 g/l of products A1) to D1) (fluorine content of the liquors 3.4 g/l), contains 10 g/l of a 75% aqueous cellulose crosslinking agent (dimethylol dihydroxyethylene urea and pentamethylol melamine etherified with methanol in a ratio of 9:2), 20 g/l of an about 70% dimethylol dihydroxyethylene urea etherified with methanol (containing small amounts of neutral salt), 6 g/l extender (25% solvent-free nonionic dispersion of the product according to Example 1a) of EP-B 196,309), 9 g/l of magnesium chloride hexahydrate and 2 ml/l of 60% acetic acid, to a liquor pick-up of about 85%, dried at 110° C. for 10 minutes and cured at 150° C. for 5 minutes.

The finishing results are summarized in the Table below, in which the washings are conventional 60° C. household washings and the dry cleanings are those which are carried out in the presence of 0.5 g/l of a conventional cleaning reinforcing agent and 0.1 g/l of water (liquor ratio 1:10). The measurements were carried out after letting the finishes lie in ambient atmosphere for 12 hours. The oil-repellency was carried out according to AATCC 118-1972 and the water-repellency according to DIN 53888 (a=water absorption in %, b=water-repellent effect).

| Liquor | Original values Oil-/water-rep. a | Original values Oil-/water-rep. b | After 1 × dry cleaning Oil-/water-rep. a | After 1 × dry cleaning Oil-/water-rep. b | After 5 × 60° C. machine washing Oil-/water-rep. a | After 5 × 60° C. machine washing Oil-/water-rep. b |
|---|---|---|---|---|---|---|
| Cont. product A1) (according to the invention) | 6 | 5.1 5 5 5 | 5 | 6.5 5 5 5 | 5 | 7 5 5 5 |
| Cont. product B1) (according to the invention) | 6 | 4.5 5 5 5 | 5 | 5.5 5 5 5 | 5-6 | 6 5 5 5 |
| Cont. product C1) (comparison) | 0 | 39.2 2 1 1 | 0 | 58 1 | 0 | 59 1 |
| Cont. product D1) (comparison) | 5 | 42.0 1 | 0 | — — | 0 | — — |
| Untreated | 0 | 62% — | — | — — | — | — — |

The process according to the invention using products A1) and B1) gives excellent values. Even if the amounts used of the fluorinated product are reduced by half, the oil- and water-repellent effects and their resistance to washing and cleaning entirely meet the requirements. Thus, a finish using 15 g/l of product B1) and otherwise identical liquor composition has an oil-repellency of 5, a value which does not decrease even after washing and cleaning. The water-repellency which has an initial value of 5/5/5 and a water absorption of 6.4% and only a small decrease after cleaning and washing is satisfactory over the entire range.

EXAMPLE 2

The finishing of Example 1 is repeated, except that the following products in the amounts mentioned are used in the same fluorine concentration instead of the products mentioned there (1.8 g of fluorine g/l):

A2a) 30 g/l of the product corresponding to the product mentioned in Example 1 under A1), brought to a fluorine content of 6%.
A2b) As A2a) containing 25% (=1.25 mol) excess of vinylsiloxane.
B2) 13.3 g/l SCOTCHGARD FC 251 (3M Company).
C2) 33.3 g/l of Asahi Guard AG 710 (Asahi Glass).
D2) As A2a) containing 50% (=1.5 mol) excess of vinylsiloxane.

The finishes are tested in accordance with the procedure in Example 1 and gives the following picture:

| Liquor | Original values Oil-/water-rep. | | After 1 × dry cleaning Oil-/water-rep. | | After 5 × 60° C. machine washing Oil-/water-rep. | |
|---|---|---|---|---|---|---|
| | a | b | a | b | a | b |
| Cont. product A2a) (according to the invention) | 6 | 5 5 5 | 5 | 6 5 5 5 | 4 | 6 5 5 5 |
| Cont. product A2b) (according to the invention) | 5 | .7 5 5 5 | 4–5 | 11 5 5 5 | 4 | 9 5 5 4 |
| Cont. product B2) (prior art) | 5 | 13 5 5 5 | 3 | 21 5 4 3 | 4 | 12 5 4 4 |
| Cont. product C2) (prior art) | 5 | 12 5 5 4 | 4–5 | 14 5 4 4 | 4 | 12 4 3 3 |
| Cont. product D2) (comparison) | 5 | 8 5 5 5 | 2 | 19 4 3 3 | 1 | 20 4 4 3 |

The data show the superiority of the finishes A2a) and A2b) according to the invention.

EXAMPLE 3

A product B1) is prepared according to Example 1, except that
A3) 1 mol $C_8F_{17}CH_2CH_2SH$ and
B3) 1 mol of $C_{10}F_{21}CH(CH_3)CH_2SH$
are used as the compound of formula (1) instead of the $R_f$-thiol mixture.

Products A3) (fluorine content 17%) and B3) (fluorine content 17.3%) are used to give a blue polyester/cotton coat poplin 67/33 (about 210 g/m²) a finish (liquor pickup 63%) by means of aqueous liquors which, in addition to the finishing agents mentioned in Example 1 and products A3) and B3) (amounts according to 2.26 g/l of fluorine) additionally contain 20 g/l of a commercial nonionic finely-divided aqueous 20% polyethylene wax dispersion (50% of nonylphenol ethoxylated with 15 mol of ethylene oxide, relative to the polyethylene wax, as emulsifier; polyethylene wax having a density of about 1 g/cm³ at 20° C., acid number 13, saponification number about 22), and the treatment is completed in a conventional manner to give a wash- and cleaning-resistant oil and water repellency, in which the treated fabric is additionally distinguished by a pleasant soft handle.

I claim:

1. A process for the preparation of modified polysiloxanes, which comprises reacting polyvinylsiloxanes with compounds of the formula (1)

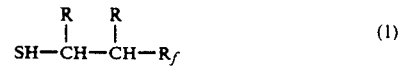

in which R is H, $CH_3$ or $C_2H_5$, in which at least one radical R is H, and $R_f$ is a perfluoroalkyl radical having 8 to 16 C atoms, in about equivalent amounts, relative to the vinyl groups, at a temperature from about 40° C., to about 120° C.

2. The process according to claim 1, wherein the polyvinylsiloxonesure predominantly linear.

3. The process according to claim 2, wherein the predominantly linear polyvinylsiloxanes are of the formula (2)

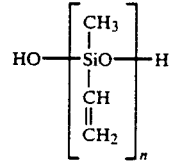

in which n is an integer from 10 to 100.

4. The process according to claim 1, wherein the reaction is carried out in the presence of organic solvents and/or in an inert gas atmosphere at 40° to 120° C. in the presence of free radical formers.

5. The process according to claim 1, wherein the reaction is carried out with an excess of polyvinylsiloxane, relative to the vinyl groups, of 30% at most.

6. The process according to claim 1, wherein $R_f$ is a perfluoroalkyl radical having 10 to 12 C atoms.

7. The process according to claim 1, wherein both Rs are H.

8. A modified polysiloxane prepared according to the process of claim 1.

9. A process of claim 3 wherein n is an integer from 30 to 50.

10. A process of claim 1 wherein the polyvinylsiloxanes and compounds of formula (1) are reacted in the presence of a free radical forming catalyst.

11. A process of claim 1 wherein the temperature is from 60° to 100° C.

12. A process of claim 1 wherein the polyvinylsiloxanes and compounds of formula (1) are reacted under an inert gas atmosphere.